United States Patent [19]

Mracek et al.

[11] 4,076,510
[45] Feb. 28, 1978

[54] METHODS AND APPARATUS FOR COATING A FILAMENT

[75] Inventors: Jaroslav Mracek, Lawrence Township, Mercer County; Un-Chul Paek, West Windsor Township, Mercer County, both of N.J.

[73] Assignee: Western Electric Co., Inc., New York, N.Y.

[21] Appl. No.: 753,767

[22] Filed: Dec. 23, 1976

[51] Int. Cl.² .................. C03C 25/02; C03B 37/02
[52] U.S. Cl. .................... 65/3 A; 65/11 W; 118/125; 118/401; 118/420; 427/54; 427/163; 427/434 C; 427/434 E
[58] Field of Search ............ 65/3 R, 3 A, 3 C, 11 W; 118/401, 420, 125, DIG. 18, DIG. 19; 427/54, 434 C, 434 D, 434 E, 163

[56] References Cited

U.S. PATENT DOCUMENTS

| 1,454,224 | 5/1923 | Schmidt | 427/434 C |
| 2,228,341 | 1/1941 | Cawthon et al. | 118/125 |
| 2,248,663 | 7/1941 | Flynn | 118/DIG. 19 |
| 3,155,543 | 11/1964 | Marzocchi et al. | 118/125 X |
| 3,339,357 | 9/1967 | Marzocchi et al. | 57/35 |
| 3,347,208 | 10/1967 | Arridge | 118/420 |
| 3,357,397 | 12/1967 | Jackman | 118/405 |
| 3,765,930 | 10/1973 | Miyano | 118/401 X |

FOREIGN PATENT DOCUMENTS 24,058 of 1912 United Kingdom ........ 118/DIG. 19

Primary Examiner—Robert L. Lindsay, Jr.
Attorney, Agent, or Firm—D. J. Kirk

[57] ABSTRACT

A glass fiber is drawn through a rotating body of flowable coating material to apply the material thereon and then is further drawn through a throat section of an open ended cage formed by a plurality of wire strands forming a hyperboloid of rotation. As the glass fiber is drawn through the throat section the previously applied flowable material contacts the wire strands causing a vortex of material which centers the fiber in the throat and distributes the material uniformly and concentrically thereon.

13 Claims, 11 Drawing Figures

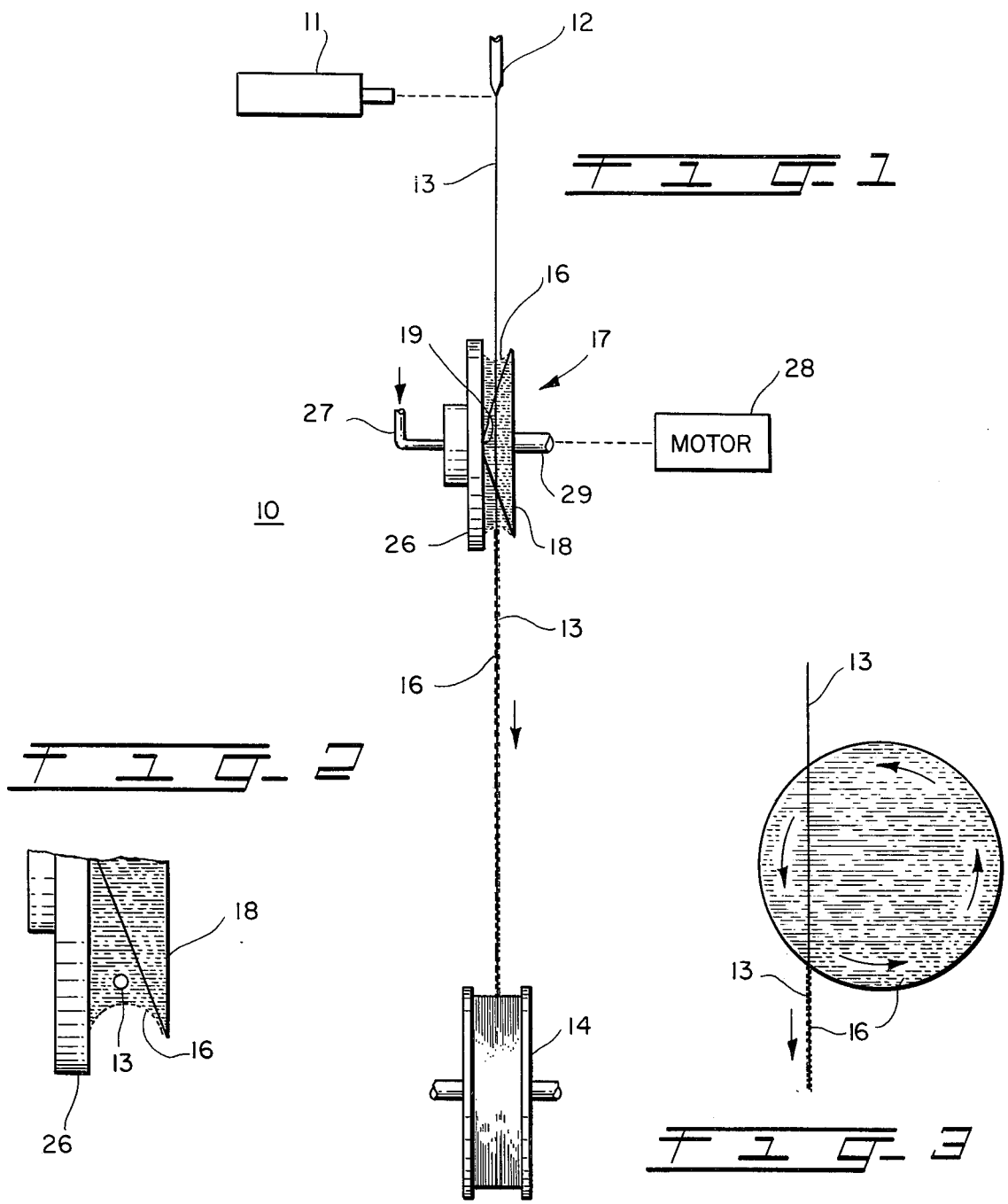

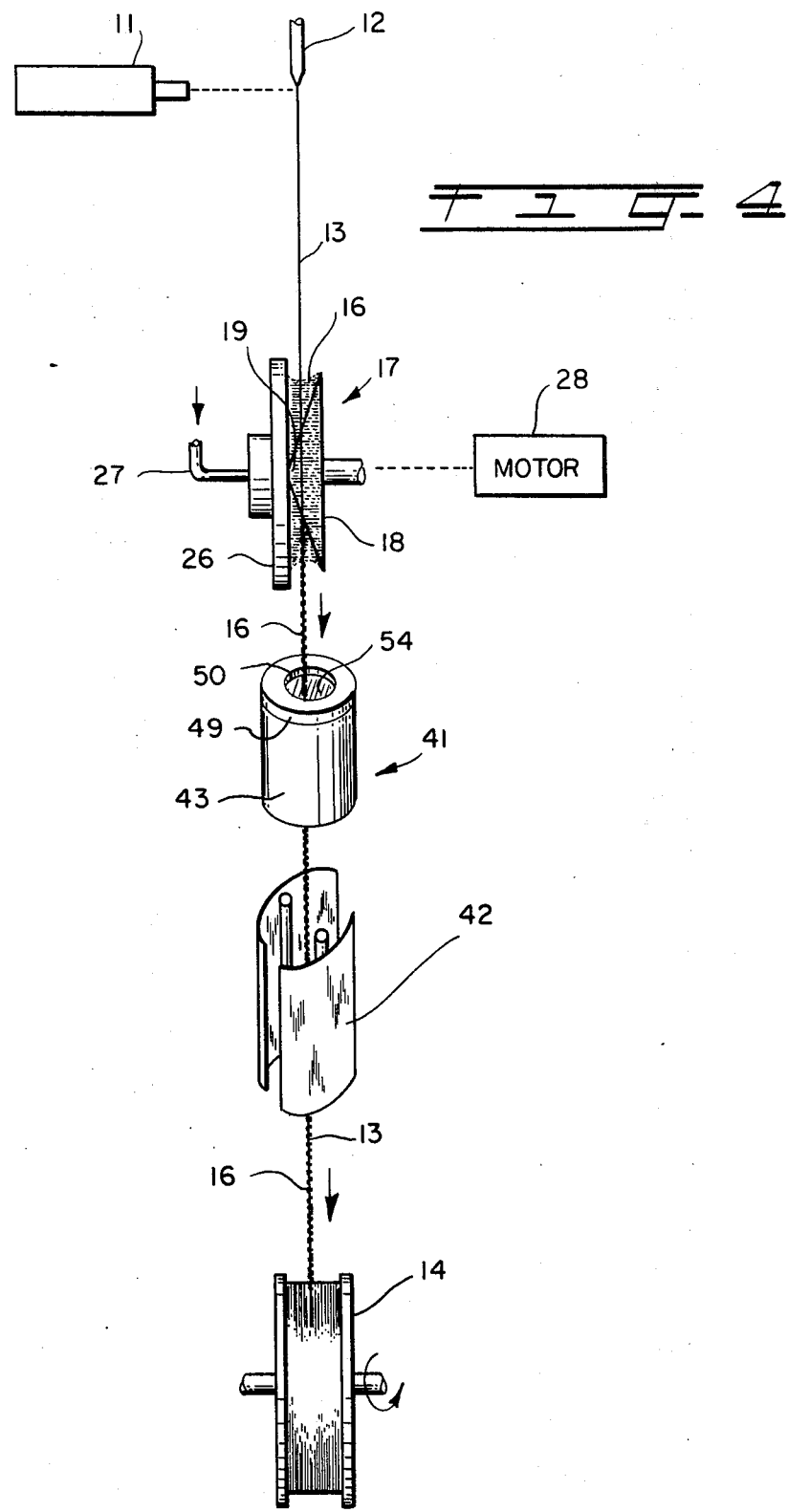

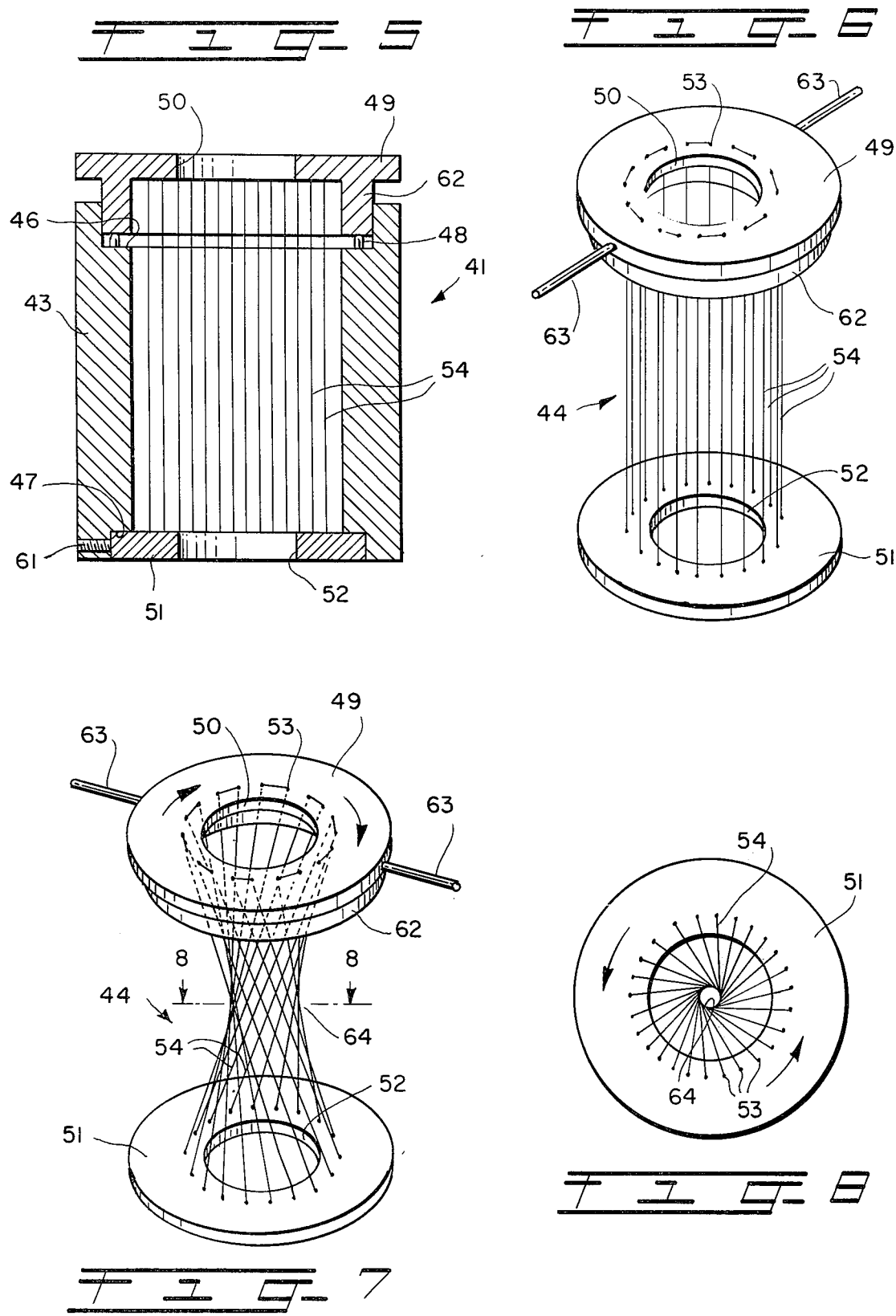

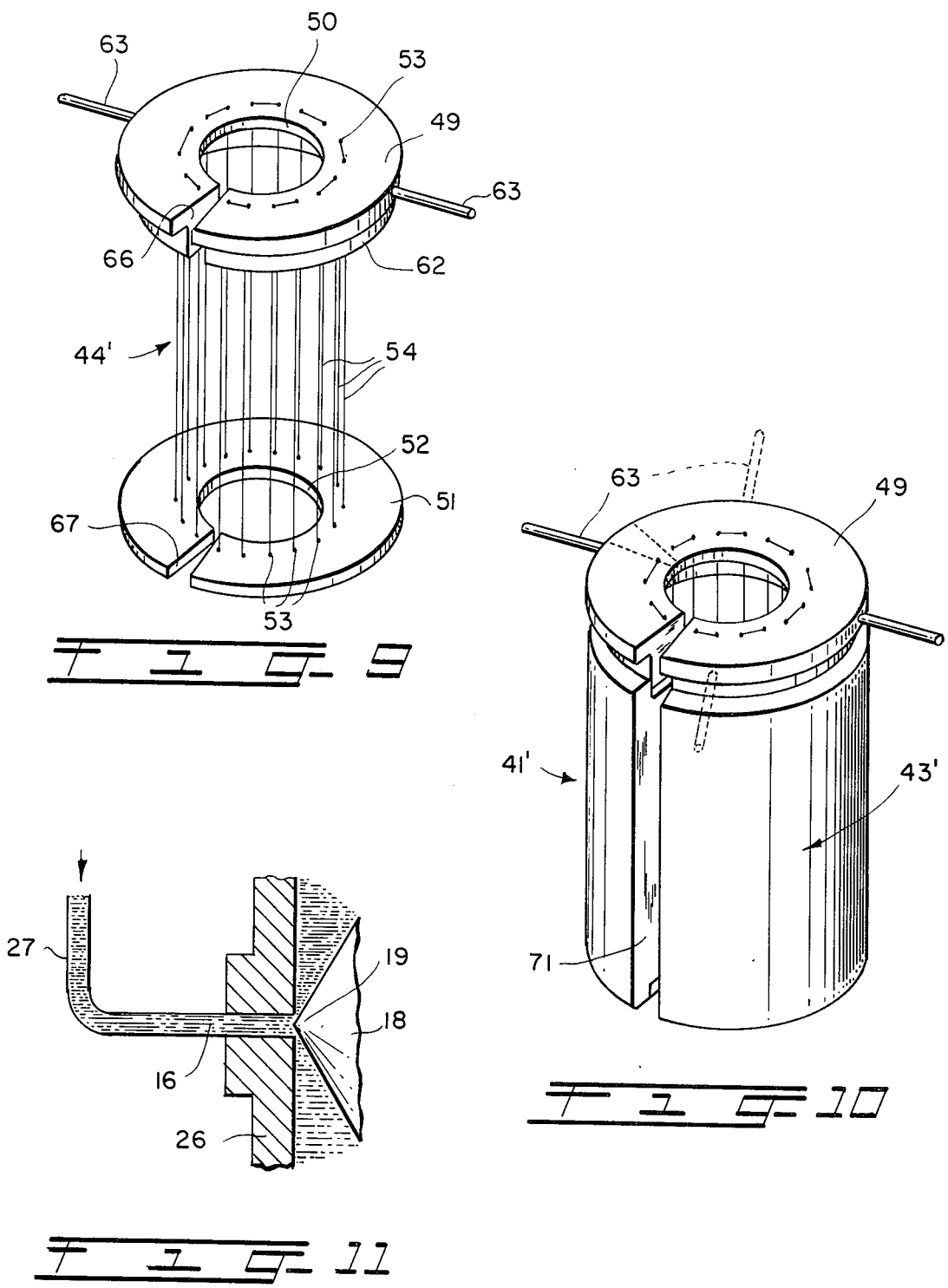

4,076,510

METHODS AND APPARATUS FOR COATING A FILAMENT

BACKGROUND OF THE INVENTION

1. Field of the Invention

This invention relates to the coating of filamentary articles. In particular continuous filaments are uniformly and concentrically coated.

2. Description of the Prior Art

In the field of optical glass fibers, it is desirable to coat a continuous glass fiber filament with a coating material in order to protect and strengthen the filament. In the prior art such continuous glass fiber filaments are coated by the extrusion of plastic as set forth in U.S. Pat. No. 3,960,530, which issued to R. Iyengar on June 1, 1976. That patent discloses a closed vertical cylinder charged with plastic coating material. The cylinder has a die aperture in the lower end thereof and an axial core tube terminating in the die aperture to form an annular orifice, the plastic being liquified to pass through the die orifice. The glass fiber filament is drawn from a source of molten glass coaxial with the core tube, continuously through the core tube. Pressurized gas is introduced into the upper portion of the cylinder to force the liquified plastic through the annular orifice and onto the filament as it leaves the axial core tube.

Such extrusion application of the plastic coating induces undesirable stresses in the coating material as it passes through the die orifice and, in addition, the drawing speed of the glass fiber filament is limited due to the relatively slow application speed of the extrusion process.

SUMMARY OF THE INVENTION

The instant invention overcomes the foregoing problems with a method for applying a flowable material to a continuous filament, comprising the steps of forming a substantially planar rotating body of the flowable material, and continuously moving the filament through the material in the plane of the rotating body of material to apply the material to the filament.

Apparatus to implement the instant method for applying the flowable material to a continuous filament comprises means for forming a substantially planar rotating body of the flowable material. Additional means are provided for continuously moving the filament through the rotating body of flowable material to apply the material to the filament.

The flowable material, once applied by using the foregoing method and apparatus, is then uniformly and concentrically distributed on the filament by drawing the filament through a material distributor means comprising an open ended cage having the shape of a hyperboloid of rotation.

The filament does not make physical contact with the material applicator or the distributor means, but only contacts the flowable material. Advantageously, this precludes undesirable scraping or abrading of the filament.

Additionally, by drawing the filament through the rotating body of flowable coating material in the direction of the rotation of the material, the material may be applied at a much faster rate than heretofore contemplated.

Also, by using an open ended cage having the shape of a hyperboloid of rotation to distribute the previously applied material, a vortex is formed which centers the filament in the throat portion of the cage. Also, by using a cage there is substantially no back pressure at the throat portion resulting in substantially no stress being applied to the coating material.

Furthermore, the open ended cage has a variable throat diameter which, advantageously, can accommodate a wide range of filament thicknesses and can control the thickness of the flowable material applied thereto.

BRIEF DESCRIPTION OF THE DRAWINGS

FIG. 1 depicts a coating material being applied to a filament in accordance with the instant invention;

FIG. 2 is a partial view of the filament passing through a rotating body of the coating material;

FIG. 3 is a side view of the rotating body of coating material with the filament being drawn therethrough in the direction of rotation of the material;

FIG. 4 depicts a filament being drawn through the rotating material and through an open ended material distribution cage to distribute the material on the filament;

FIG. 5 is a cross-sectional view of the open ended distribution cage mounted within a housing;

FIG. 6 is an isometric view of the distribution cage;

FIG. 7 is an isometric view of the distribution cage wherein one end has been rotated to form a hyperbolic cross section;

FIG. 8 is a cross-sectional view through the throat of the distribution cage in a plane perpendicular to the axis thereof;

FIG. 9 is an isometric view of a modified distribution cage;

FIG. 10 is an isometric view of a modified distribution cage housing; and

FIG. 11 is a cross-sectional view of the instant material applicator.

DETAILED DESCRIPTION

The instant invention is related to a method and apparatus for applying and distributing a flowable material to a filament and is herein described in relation to the application of a protective coating of material to a glass fiber filament. However, it should be understood that such description is exemplary only and is for the purposes of exposition and not for purposes of limitation. It will be readily appreciated that the inventive concept as described is equally applicable for applying and distributing flowable material to any filament such as metallic wire, string, yarn, or the like.

The instant coating apparatus is generally designated by the numeral 10 in FIG. 1. A laser 11 or any other kind of heat source such as resistance or induction furnace is used to melt a portion of a glass preform 12 and a continuous glass fiber filament 13 is then drawn from the melt zone onto a rotatable take-up reel 14. The filament 13 passes through a substantially planar rotating body of flowable material 16 which is formed by an applicator, generally designated by the numeral 17.

The applicator 17 is comprised of a rotatable conical member 18 having an apex 19 in juxtaposition to a planar plate 26. The flowable material 16 is fed into the volume bounded by the surface of the plate 26 and the rotatable conical member 18 through a conduit 27. The apex 19 projects slightly into, but does not make contact with the end of the conduit 27, as can best be seen in the enlarged partial cross-sectional view of FIG. 11. The rotatable conical member 18 is rotated under the control of a variable speed motor 28 via a shaft 29.

In operation, the motor 28 is activated to rotate the conical member 18 as the flowable material 16 is introduced between the conical member and the plate 26, via the conduit 27, to fill the volume therebetween. As the conical member 18 rotates, the viscous force of the flowable material 16, balanced with the centrifugal and gravitational forces, holds the flowable material between the conical member and the plate 27. For a small angle between the surface of the conical member 18 and the plate 26, of 3 degrees or less, the rotating body of flowable material 16 is substantially planar in shape and in a specific embodiment has been operated in a vertical plane. Although the vertical positioning of the flowable material 16 has been found to be most advantageous it is contemplated that any plane including the horizontal may be used depending upon the particular application.

Once the flowable material 16 has been rotated to form the substantially planar body of material the laser 11 is activated and directed at the optical glass preform 12 to form a melt zone from which the optical fiber filament 13 is drawn. The glass fiber filament 13 passes through the substantially planar body of flowable material 16 without making contact with either the plate 26 or the rotable conical member 18 as can best be seen in the enlarged partial plan view of FIG. 2.

FIG. 3 depicts a cross-sectional view in elevation of the rotating body of flowable material 16 with arrows indicating the direction of movement of the material. The filament 13 is shown passing through the flowable material 16 in the same direction as the movement of the material. Advantageously, this permits application of the material 16 to the filament 13 at high drawing speeds since the material can be made to move at substantially the same velocity as the filament. This was not possible using the prior art extrusion techniques.

In a particular working embodiment of the instant invention, the glass fiber filament 13 was an optical fiber having a diameter ranging from approximately 70 to 200 micrometers and the coating applied was approximately 50–100 micrometers thick.

The material 16 used was a "hot melt" plastic which is raised to its melting temperature prior to being fed to the applicator 17 via the conduit 27. The use of such "hot melt" plastics may require that the conduit 27 and/or the plate 26 be heated during operation. In particular, the "hot melt" plastic used was Ethylene-Vinyl Acetate (EVA) having a melting temperature of 180° C. and a viscosity in the neighborhood of 150 poise. Once the material 16 has been applied to the filament 13, it becomes hardened as it travels between the applicator 17 and the take-up reel 14 due to cooling of the material to ambient temperature.

The plate 26 was circular in shape with a diameter of 10 centimeters and made of aluminum. The surface of the conical member 18 formed an angle of 3° with the plate 26 and was rotated at a tangential velocity of approximately 0.2 meters per second as the optical fiber filament 13 was drawn at a speed of approximately 0.75 meters per second for the EVA material. The viscosity level of the coating material used is one of the governing factors determining the maximum drawing speed.

FIG. 4 depicts the coating apparatus 10 shown in FIG. 1 with the addition of distribution apparatus 41 and a curing apparatus 42 positioned in tandem with the applicator 17.

It should be noted that although the applicator 17 advantageously applies the coating material 16 to glass fiber filament 13, the coating may be non-uniform in thickness. Thus, the purpose of the distribution apparatus 41 is to uniformly and concentrically distribute the flowable material 16 which was previously applied to the glass fiber filament 13. Although FIG. 4 depicts an embodiment in which the flowable material 16 was applied by the applicator 17, such apparatus is not required. Any apparatus which can apply the flowable material 16 such as that shown in the above-referred to Iyengar patent or the like may be used. All that is required is that the flowable material 16 be, in some fashion, applied to the fiber 13 prior to passing through the distribution apparatus 41.

The distribution apparatus 41 schematically shown in FIG. 4 is shown in detail in FIGS. 5, 6 and 7. FIG. 5 is a cross-sectional view of the distribution apparatus 41 fully assembled and which comprises a cylindrical housing 43 having a distribution cage 44 therein which can best be seen in FIGS. 6 and 7. The cylindrical housing 43 has upper and lower shoulders 46 and 47, respectively. The upper shoulder 46 has a plurality of upwardly projecting spring biased pins 48—48.

The distribution cage 44 is comprised of a first circular plate 49, having a first central aperture 50, which is spaced from and aligned with a second circular plate 51 having a second central aperture 52. Both plates 49 and 51 have a plurality of holes 53—53 arranged in a circular array about the first and second central apertures 50 and 52, respectively. A strand 54 is threaded through the holes 53—53 of the plates 49 and 51 to form the distribution cage 44 connected by substantially parallel sections of the filament 54 as can best be seen in FIG. 6. The filament 54 may be fine wire, nylon or the like having a melting point above the melting point of the flowable material 16.

The distribution cage 44 is shown assembled within the cylindrical housing 43 in FIG. 5. The second cylindrical plate 51 is seated in the lower shoulder 47 of the housing 43 and is held fixedly in place by a set screw 61. A downwardly extending section 62 of the first circular plate 49 is seated within the upper shoulder 46 on the spring biased pins 48—48.

Prior to the distribution operation, the first circular plate 49 is rotated using a pair of outwardly extending arms 63—63 as shown in FIG. 7. As the first circular plate 49 is rotated, it simultaneously moves downward, urging the spring biased pins 48—48 down into the cylindrical housing 43. As the first circular plate 49 is rotated the normally parallel filaments 54—54 (see FIG. 6) now become skewed as shown in FIG. 7 forming a hyperboloid of rotation with a throat 64 (see FIG. 8) that can be varied as a function of the angular rotation of the first circular plate 49. Once the desired diameter of the throat 64 has been obtained the first circular plate 49 is maintained in the position with the spring biased pins 48—48 which are held in place by the frictional contact between the plate and the pins. Accordingly, the throat 64 can be varied to accommodate a wide variety of filament diameters by rotating the first circular plate 49 to provide the desired diameter in the throat. Additionally, by varying the diameter of the throat 64 the thickness of the coating material 16 on the fiber 13 can be controlled. The wider the diameter of the throat 64 the thicker the coating will be.

FIGS. 9 and 10 depict a modified distribution cage 44′ and distribution apparatus 41′, respectively. The distribution cage 44' has a first radial slot 66 formed in the first circular plate 49 and is aligned with a second radial slot 67 formed in the second circular plate 51 when in the unoperated position. FIG. 10 shows the distribution apparatus 41' assembled within a modified cylindrical housing 43' having a longitudinal opening 71 therein. Prior to the rotation of the first circular plate 49 as hereinbefore described, the first and second slots 66 and 67 are aligned with the longitudinal opening 71 to provide radial access for the continuous optical fiber filament 13 to the central portion of the distribution cage 44'.

In operation, as can best be seen in FIG. 4, once the flowable material 16 has been applied by the applicator 17 (or other applying means) to the optical fiber filament 13, the filament is drawn through the distribution apparatus 41. The coated filament 13 is threaded axially through the central apertures 50 and 52 when using the distribution cage 44 depicted in FIG. 6 or the filament may be inserted radially through the slots 66 and 67 and the aligned longitudinal opening 71 when using the distribution apparatus 41' shown in FIG. 10.

As the optical fiber filament 13 is drawn through the distribution apparatus 41 the flowable material 16 on the filament 13 contacts the sections of skewed strand sections 54—54 which tends to move the material in a spiral direction, along the path of the filaments (see FIG. 8) forming a vortex of the flowable material terminating at the throat 64 of the cage 44. As the filament 13 is pulled through this vortex, it is automatically centered within the throat 64 of the distribution cage 44 by the movement of the flowing material 16 causing the material to be uniformly distributed to concentrically coat the filament 13. Additionally, by forming the throat 64 with a plurality of strand sections 54—54 there is substantially no back pressure at the throat, resulting in a stress-free coating.

Once the filament has been uniformly and concentrically coated with the flowable material 16 it is wound about take-up reel 14. The curing apparatus 42 is used to cure the flowable material 16 coating the filament 13 prior to take-up when curing is required.

The material 16 can be a material having a low enough viscosity to flow into the volume between the plate 26 and the rotatable conical member 18 and sufficiently high viscosity to be held within that volume as the rotatable conical member is rotated. An example of such a material which can be used at normal room temperatures would be any curable materials such as a resin or epoxy which is flowable at room temperatures. Such materials generally require use of the curing apparatus 42 to cure the material prior to being rolled onto the take-up reel 14. Such curing may be accomplished by heat curing (i.e., infra-red or the like) or by polymerization (i.e., ultra-violet or the like) depending on the selection of materials.

What is claimed is:

1. A method for applying a viscous fluid material to a continuous filament, comprising the steps of:
   introducing the material into the volume between the surfaces of a substantially planar member and a conical member rotating thereon to form a substantially planar rotating body of the material; and
   continuously moving the filament through the material in the plane of the rotating body of material to apply the material to the filament.

2. The method as set forth in claim 1, wherein the substantially planar rotating body of material is formed in a vertical plane.

3. The method as set forth in claim 1, wherein the filament moves through the material in the same direction as the rotation of the material.

4. An apparatus for uniformly and concentrically coating a continuous filament, of substantially circular cross-section, with a viscous fluid material, comprising:
   means for forming a substantially planar rotating body of the material;
   means for forming a vortex of the material in tandem relationship with the rotating body of material; and
   means for moving the filament through the rotating material in the plane of the rotating body of material and through the central portion of the vortex to uniformly and concentrically coat the filament.

5. The apparatus as set forth in claim 4, wherein the filament is a continuous glass fiber and the means for forming a substantially planar rotating body of the material comprises:
   a planar plate;
   a rotatable conical member having an apex juxtaposed to the planar plate; and
   means for rotating the conical member as the material is introduced in the volume between the plate and the surface of the conical member to form the substantially planar rotating body of material.

6. A method of coating a continuous filament with a viscous fluid material, comprising the steps of:
   introducing the material into the volume between the surfaces of a substantially planar member and a conical member rotating thereon to form a substantially planar rotating body of material;
   drawing the filament through the rotating body of material, in the plane thereof, to apply said material to the filament; and
   further drawing the filament through the center of a vortex of the material to redistribute the material on the filament.

7. A method of coating a continuous glass fiber with a viscous fluid material, comprising the steps of:
   (a) introducing the material between a flat plate and a cone rotating thereon to form a substantially planar rotating body of material;
   (b) drawing the glass fiber through the rotating body of material, in the plane of the rotating body of material, to apply said material thereon;
   (c) further drawing the glass fiber through a throat portion of a vortex of the material to redistribute said material on the fiber; and
   (d) curing the material to harden the coating.

8. The method as set forth in claim 7 wherein the coating material is a hot melt material which must be heated prior to step (a) to at least the melting temperature thereof, and the curing step (d) is accomplished by cooling the coating material to a temperature below the melting temperature.

9. The method as set forth in claim 7 wherein the coating material is flowable at room temperature and the curing step (d) is accomplished by subjecting the coating to an ultra-violet light.

10. The apparatus as set forth in claim 4, wherein the filament is a continuous glass fiber and the vortex forming means is a distribution cage which is comprised of:
   a pair of spaced and aligned top and bottom plates, each plate having a central aperture therein; and a plurality of spaced strand sections connecting the top and bottom plates, and which upon rotation of one of the spaced plates relative to the other spaced plate said strand sections define a hyperboloid of rotation.

11. Apparatus for applying a viscous fluid material to a continuous filament, comprising:
a planar plate;
a rotatable conical member having an apex juxtaposed to the planar plate;
means for rotating the conical member as the material is introduced in the volume between the plate and the surface of the conical member to form a substantially planar rotating body of the material; and
means for continuously moving the filament through the material in the plane of the rotating body of material to apply the material to the filament.

12. The apparatus as set forth in claim 11 in which the angle between the surfaces of planar plate and the rotatable conical member is equal to or less than three degrees.

13. The distribution cage as set forth in claim 10, wherein the top and bottom plates have radial slots therein to provide radial access to the central portion of the distribution cage by the continuous filament.

* * * * *